United States Patent [19]

Folding et al.

[11] Patent Number: 4,737,334
[45] Date of Patent: Apr. 12, 1988

[54] PLASTIC MOLDING OF AN IMPROVED LUER NUT

[75] Inventors: Lawrence V. Folding, Sterling, Mass.; Roy A. Rosen, Woodstock, Conn.

[73] Assignee: Hewlett-Packard Company, Palo Alto, Calif.

[21] Appl. No.: 22,701

[22] Filed: Mar. 6, 1987

[51] Int. Cl.4 ................................................ B28B 7/20
[52] U.S. Cl. .................................. 264/318; 285/332; 264/334; 425/438; 425/441; 425/444; 425/556; 425/577; 425/DIG. 58; 249/59; 249/63; 249/161
[58] Field of Search ............... 285/332; 264/313, 318, 264/328.1, 334; 425/556, 557, 595, 577, 441, 444, 438, DIG. 58; 249/161, 165, 59, 63, 144

[56] References Cited

U.S. PATENT DOCUMENTS

| | | | |
|---|---|---|---|
| 952,279 | 3/1910 | Roberts | 249/59 |
| 2,558,027 | 6/1951 | Wilson | 425/556 |
| 3,054,145 | 9/1962 | Itelpa | 264/318 |
| 4,266,815 | 5/1981 | Cross | 285/332 |

OTHER PUBLICATIONS

American National Standard for Medical Material–Luer Taper Fittings–Performance; ANSI/HIMA MD70.1-1983.

Primary Examiner—Bernard Nozick
Attorney, Agent, or Firm—Jeffrey B. Fromm

[57] ABSTRACT

A novel plastic mold and method is disclosed for forming a Luer nut which has a polygonal internal cross-section. The mold includes both movable and fixed cavity sections, so that a non-round threaded core can be unscrewed from within the Luer nut.

3 Claims, 3 Drawing Sheets

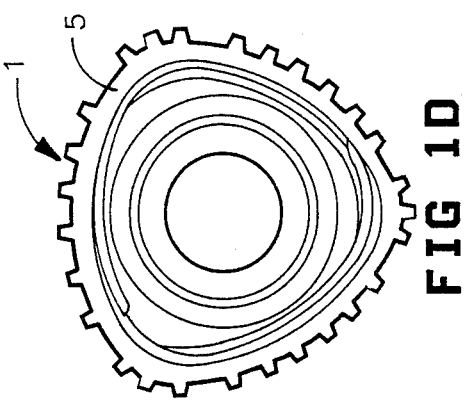
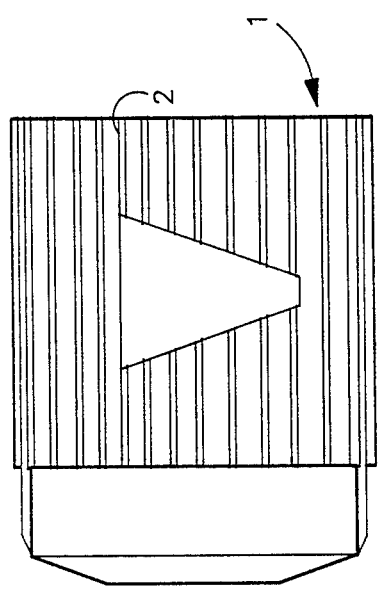
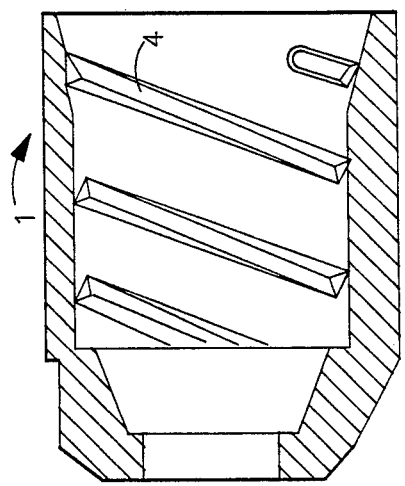
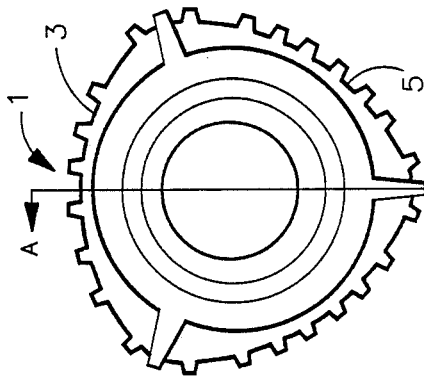

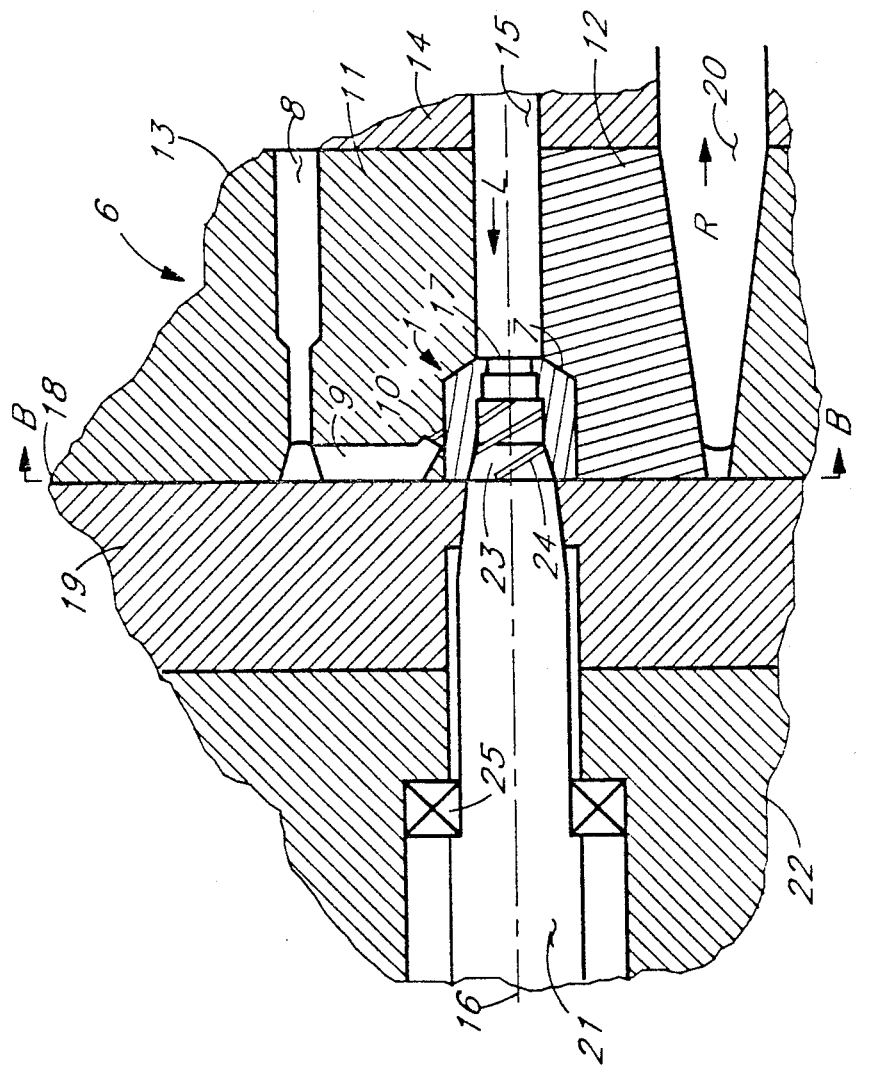

PLASTIC MOLDING OF AN IMPROVED LUER NUT

BACKGROUND OF THE INVENTION

A Luer nut is a device that is usually used in the medical field to hold two liquid carrying fittings together. The fittings have a Luer taper as described in the American National Standard ANSI/HIMA MD70.1-1983. The Luer taper is used to make quick, leak proof connections, and is comprised of two tapered pieces, one male and one female. The male and female parts are drawn together to make a tightly fitting connection. The connection is held together by a male thread on the female Luer taper part and a nut-like device with internal threads, called a Luer nut, on the male Luer taper part.

An improved Luer nut is disclosed by Thomas P. Stephens in U.S. patent application, Ser. No. 740,353, entitled "Non-Loosening Luer Nut", filed June 3, 1985. The internal cross section of the threaded section of the improved Luer nut is not round like previous Luer nuts, but is generally in the shape of a polygon that is deformable rather than stiff. The polygonal cross-section of the improved Luer nut frequently is in the general shape of a triangle with rounded sides each with a relatively large average radius and rounded corners each with a relatively small radius, which is referred to as a trilobate shape.

Unfortunately, the plastic molding of such a Luer nut having a polygonal internal cross-section is a significant problem. In general, prior molding techniques for conventional plastic nuts utilize a mold cavity with fixed dimensions to define the outside shape of the nut, and a removable, externally threaded core within the mold cavity around which the plastic nut is molded. After the plastic is injected into the mold cavity and allowed to solidify, the threaded core is simply unscrewed, and the finished nut ejected along a parting line of the mold. Such a technique will generally not work for a nut which is not internally round in section, because the threaded core for the polyognal Luer nut must also be polygonal in external cross section. Such a non-round threaded core cannot generally be unscrewed from within the solidified nut without damaging the sides of the nut due to the fixed dimensions of the mold cavity.

One solution to this problem is to extract the polygonal core from within the cavity while the nut is still attached. Then, a secondary apparatus acting like a human hand can be used to grab and hold the outside of the nut at points adjacent to the vertices of the polygonal section, so that the core can be unscrewed without stripping the threads. Naturally, such a procedure is time consuming and expensive.

A second solution to the problem of molding such a polygonal nut is to use a collapsible core. That is, the threaded core is designed so that it can be folded in on itself after the plastic has solidified. Unfortunately, Luer nuts are generally small, with an internal diameter on the order of five millimeters. In general, building a collapsible core with such small dimensions is impractical.

SUMMARY OF THE INVENTION

The present invention involves a technique for automatically molding the new Luer nut, with its polygonal internal cross-section. For ease of description, this technique will be described with respect to a plastic Luer nut with a generally trilobate internal shape. However, the technique can readily be adapted to molding of materials other than plastic, and to any nut with a non-round, polygonal internal cross-section.

For a trilobate nut, an inner threaded core having a generally trilobate external cross-section is arranged in spaced relationship to a cavity within a mold housing. In general, the cavity will have a generally trilobate internal cross-section so that the resulting Luer nuts will have a relatively constant wall thickness. After the plastic is injected within the space between the outer surface of the threaded core and the inner surface of the cavity and has been allowed to solidify sufficiently to permit part removal, the sections of the mold cavity adjacent to the large radius sides of trilobate section are permitted to move away from the nut, while the sections of the mold cavity adjacent to the small radius corners of the trilobate sections are maintained in fixed contact with the outside surface of the nut. The movable sections of the mold cavity provide areas for the molded part to expand into as the trilobate shaped threaded core is unscrewed. Since the nut and the mold core are both trilobate in sectional shape, and because sections of the cavity are movable, the portions of the part which are adjacent to the large radius portions of the core have room to expand as the three high lobes on the threaded core rotate within the nut.

In addition to having movable sections into which the nut can expand as the core is unscrewed, it is also necessary that the cavity hold the nut around its perimeter to prevent the nut from turning with the core as the core is rotated. This can be accomplished by having longitudinal slots in the inner wall of the cavity to form ribs on the outside of the nut which prevent the nut from rotating as the core is rotated. The ribs can be made significantly shorter in height, while still providing sufficient resistance to rotation especially when the threaded core initially begins to unscrew, by spacing several slots and the resulting ribs around the nut and thereby extending into both the fixed and movable sections of the mold cavity. If desired, additional resistance to rotation of the nut can be provided through the use of radially inwardly acting springs connected to the movable sections of the mold cavity.

The mold can be readily adapted to form a plurality of Luer nuts at one time by providing an equal number of cavities and threaded cores within the mold housing.

BRIEF DESCRIPTION OF THE DRAWINGS

FIG. 1A-1D show an outside side view, left side view, sectional view and right side view, respectively, of a trilobial Luer nut.

FIG. 2 shows a side sectional view along the central longitudinal axis of a plastic mold according to a preferred embodiment of the present invention.

DESCRIPTION OF THE PREFERRED EMBODIMENT

Figure 3A:
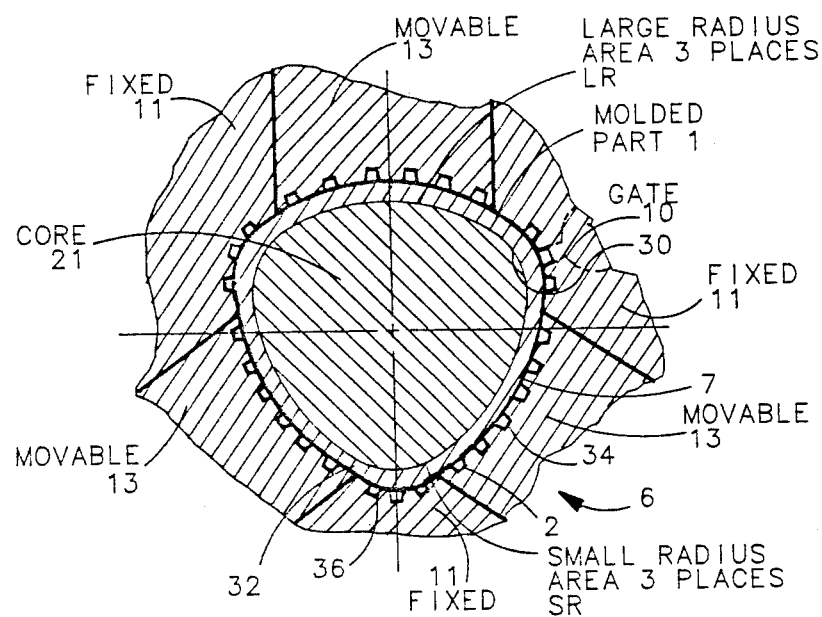
FIGS. 3A and 3B show sectional views taken along the parting line of the mold as shown in FIG. 2 in an as molded position and in an unscrewing position of the core, respectively.

FIGS. 1A-1D show the shape of a trilobate Luer nut, which is the result of the molding technique of the present invention. FIG. 1A shows an outside view of the Luer nut 1, including a plurality of ribs 2. In the finished part, the ribs 2 serve to provide means by which a user can easily grip and turn the nut 1 for screwing it onto a mating female part (not shown). Because the ribs 2 are intended to be manually gripped it is desirable that the ribs 2 not be so high as to irritate the user. As shown in FIG. 1B, it is also desirable that the ribs 2 be relatively evenly spaced around the circumference 3 of the nut 1. FIG. 1C, which is a sectional view of the nut 1 taken along the axis A—A as shown in FIG. 1B, shows the internal Luer Threads 4. As shown in both FIGS. 1B and 1D, the illustrated nut has both an inner and outer trilobate shpae, so that the mean thickness of the wall 5 is essentially constant around the circumference of the nut 1 at any plane along the length of the nut. If desired, the wall thickness can be varied to provide an outer shape which is any desired shape, including round.

FIG. 2 shows a side sectional view of the plastic mold 6 according to a preferred embodiment. The nut 1 is formed within a cavity 7 by injecting a thermoplastic such as polyester (e.g., Valox 325 available from the General Electric Company) via a sprew 8 and a runner 9 and a gate 10 into the cavity 7. The radial sides of the cavity 7 are formed, in the case of a trilobate nut, by three fixed sectors 11 and three movable sectors 12 in a cavity retainer plate 13. Added strength is provided by a cavity backup plate 14 to the outside of the cavity retainer plate 13. A knock-out pin 15 extends through the cavity retainer plate 13 and the cavity backup plate 14, and is mounted so that the pin 15 can slidably move along the central axis 16 of the cavity 7. The knock-out pin 15 serves two purposes: first, when in the position shown in FIG. 2, its end 17 provides one end of the cavity 7; and, second, when the nut 1 is ready to ejected from the mold 6, it can be moved longitudinally in direction L to push the nut 1 out of the mold 6 via a parting line 18 between the cavity retainer plate 13 and a stripper plate 19. A movable pin 20 is also provided within the cavity retainer plate 13, which in the position shown locks the movable sectors 12 relative to the fixed sectors 11. When the pin 20 is moved longitudinally in direction R, the movable sectors 12 are free to move with respect to the fixed sectors 11 with respect to the central axis 16. A threaded core 21 is provided extending through a core retainer plate 22, the stripper plate 19, into the cavity 7. The threaded core 21 has an end 23 with external Luer threads 24, with a trilobate external cross-section, and serves to provide the internal shape of the nut 1. The threaded core 21 can be rotated within a bearing 25 by an external rotating mechanism (not shown), such as an oil cylinder and rack and pinion gear. In order to unscrew the threaded core 21 from within the nut 1, the core retainer plate 22 is moved in direction L at the same rate as the pitch of the Luer threads 24. The coordinated movement of the rotation of the threaded core 21 and the core retainer plate 22 can be accomplished by conventional means, such as a cam (not shown) connected to the external rotating mechanism.

Figure 3B:
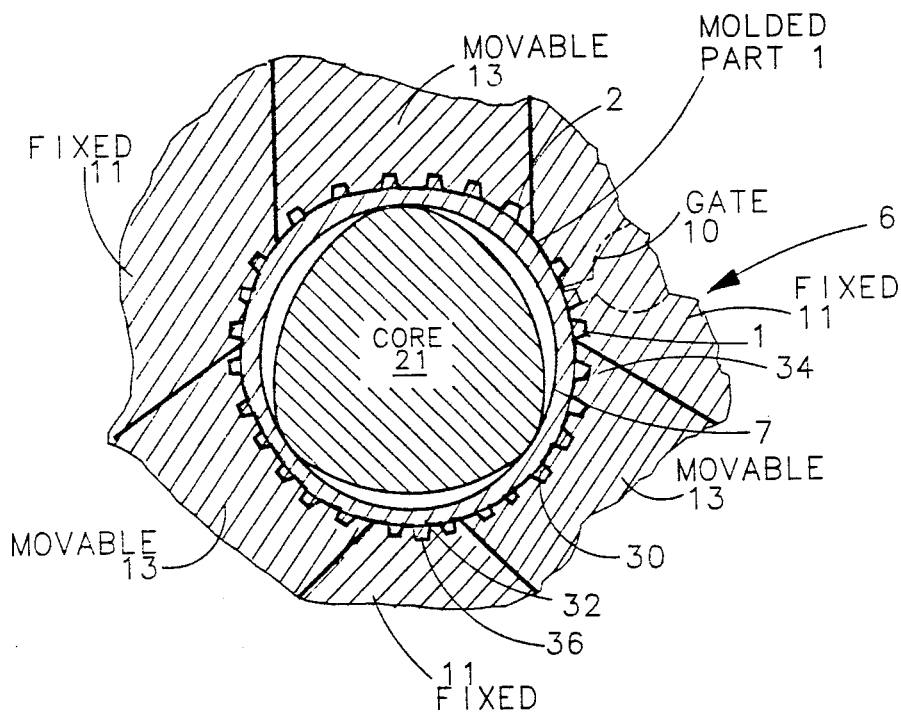

FIGS. 3A and 3B show a sectional view of the mold 6 taken along the parting line 18, as indicated by axis B—B. FIG. 3A shows the mold 6 when the nut 1 is in its as molded position. For purposes of further discussion, the corners of the nut 1 will be referred to as the small radii sr, and the portions between the corners will be referred to as the large radii LR. The outermost portions 30 of the core 21 form the small radii sr, and when the core 21 is unscrewing, the portions 32 of the nut 1 initially adjacent to the portions 30 of the core 21 do not have to expand because they are the outermost portions of the nut 1. Therefore, the portions 32 of the nut 1 can be in an area of the mold 6 that does not expand, that is, the fixed sectors 11. Further, since the fixed sectors 11 do not have to expand, they can serve to hold the nut 1 from rotating while the core 21 is unscrewing. The large radii portions LR of the nut 1 must, however, expand while the core 21 is unscrewing as shown in FIG. 3B. Thus the movable sectors 13 must move radially outward so that the large radii portions LR of the nut 1 can expand as the high points 30 of the core 21 rotate within the nut and push the large radii portions LR radially outward. In general, the force of the unscrewing core 21 is sufficient to expand the movable sectors 13, but active means, such as a cam (not shown) coupled between the core and the moveable sectors 13 could be used as well.

The core 21 applies considerable torque to the nut 1 while being unscrewed because the molded nut 1 is continually being distorted as the core 1 is removed. In addition, when the core unscrewing just begins, there is a very large amount of torque applied to the nut 1 until the initial part/core break away takes place. The torque applied to the nut 1 after initial break away is considerably less. This high initial torque could cause the nut 1 to turn and strip off the outside texture of the nut 1 unless the nut 1 is held firmly within the cavity 7. Such stripping is prevented by the use of slots 34 and 36, which form the ribs 2 on the nut 1. At least one of the sets of slots 34 or 36 are therefore required to prevent rotation of the nut 1. However, it is preferable that slots 36 and 34 be provided in both the fixed sectors 11 and the movable sectors 13, respectively, to provide sufficient holding, so that the ribs 2 need not be too high and/or thick. If added holding force is required, inwardly acting springs (not shown) can be then coupled to the moveable sectors 13 to maintain the even higher resistance to rotation of the nut 1. Once the initial break away of the core 21 has occurred, the moveable sectors 13 can stay in their radially expanded position, and can be retained there either by friction or by a detent device (not shown).

The use of the fixed sectors 11 also permits the sprew 8, the runner 9 and the gate 10 to be machined therein. This is generally very desireable, so that the mold can easily be run with automatic gate and runner removal.

Overall operation of the molding process occurs as follows:

1. The pin 20 is inserted to fix the movable sectors 12 relative to the fixed sectors 11, and the core retainer plate 22 is moved inward to close the mold along the parting line 18;

2. Plastic is injected through the sprew 8, runner 9 and gate 10 to fill the space between the threaded end 23 of the core 21 and the cavity 7;

3. After the plastic solidifies, the pin 20 is released to release the movable sectors 12;

4. The core 21 is rotated and core retainer plate 22 is retracted simultaneously at the rate of the pitch of the Luer threads 24 on the end 23 of the core 21;

5. After the core 21 is fully unscrewed from within the nut 1, the mold 6 is opened along the parting line 18;

6. The knock-out pin 15 pushes the finished nut 1 out of the cavity 7 and out of the mold 6 along the parting line;

7. The waste plastic within the sprew 8, runner 9 and gate 10 are pushed out of the mold 6 by conventional means. The molding cycle is now ready to begin again.

What is claimed is:

1. A method comprising the steps of:

forming internally threaded plastic nuts which have a rounded cornered polygonal internal cross-section of n number of sides between a cavity having n number of fixed sectors and n number of movable sectors arranged circumferentially around the central axis of said cavity and a rotatable externally threaded core having a rounded cornered polygonal external cross-section of n number of sides within a housing;

holding the movable sectors in fixed relationship with the fixed sectors during the forming step;

releasing the movable sectors so they can move radially with respect to the fixed sectors; and unscrewing the threaded core after the plastic has hardened and while the fixed sectors prevent rotation of the nuts.

2. A method as in claim 1 further comprising the step of ejecting the threaded nut from the cavity.

3. A method as in claim 1 further comprising the step of maintaining all of the fixed and moveable sectors in engagement with portions of the outer perimeter of the nuts during initial breakaway of the core from the nut.

* * * * *

UNITED STATES PATENT AND TRADEMARK OFFICE
CERTIFICATE OF CORRECTION

PATENT NO. : 4,737,334
DATED : April 12, 1988
INVENTOR(S) : Lawrence V. Folding, Roy A. Rosen It is certified that error appears in the above-identified patent and that said Letters Patent is hereby corrected as shown below:

Column 1, line 43, "polyognal" should read --polygonal--;

Column 2, line 66, "outside view" should read --outside side view--;

Column 3, line 11, "shpae" should read --shape--.

Signed and Sealed this

Eighth Day of November, 1988

Attest:

*Attesting Officer*

DONALD J. QUIGG

*Commissioner of Patents and Trademarks*